(12) United States Patent
Hortig et al.

(10) Patent No.: US 9,068,609 B2
(45) Date of Patent: Jun. 30, 2015

(54) AISLE EMERGENCY BRAKE FOR RAIL-GUIDED VEHICLE

(75) Inventors: Philipp J. Hortig, Rockford, MI (US); Pascal Rehm, Hanau (DE)

(73) Assignee: Dematic Systems GmbH, Heusenstamm (DE)

( * ) Notice: Subject to any disclaimer, the term of this patent is extended or adjusted under 35 U.S.C. 154(b) by 19 days.

(21) Appl. No.: 14/002,470

(22) PCT Filed: Mar. 29, 2012

(86) PCT No.: PCT/US2012/031199
§ 371 (c)(1),
(2), (4) Date: Aug. 30, 2013

(87) PCT Pub. No.: WO2012/138538
PCT Pub. Date: Oct. 11, 2012

(65) Prior Publication Data
US 2013/0333987 A1    Dec. 19, 2013

Related U.S. Application Data

(60) Provisional application No. 61/471,326, filed on Apr. 4, 2011.

(51) Int. Cl.
*F16D 63/00* (2006.01)
*B65G 1/04* (2006.01)

(52) U.S. Cl.
CPC .............. *F16D 63/00* (2013.01); *B65G 1/0492* (2013.01)

(58) Field of Classification Search
CPC ........ F16D 63/00; B65G 1/0492; B61H 7/12; B61H 7/02; B61K 7/62
USPC ............ 188/41–44, 62, 107, 28, 30, 31, 72.3, 188/170, 70 R, 70 B; 104/249, 250, 257, 104/258, 252, 253; 187/359; 267/162, 164
See application file for complete search history.

(56) References Cited

U.S. PATENT DOCUMENTS 1,827,162 A    10/1931   Miller
1,865,788 A    7/1932    Raymond
(Continued)

FOREIGN PATENT DOCUMENTS

DE    2059635 A1    6/1972

OTHER PUBLICATIONS

International Preliminary Report on Patentability from corresponding Patent Cooperation Treaty Patent Application No. PCT/US2012/031199 issued Oct. 8, 2013.
(Continued)

*Primary Examiner* — Thomas J Williams
*Assistant Examiner* — Mariano Sy
(74) *Attorney, Agent, or Firm* — Gardner, Linn, Burkhart & Flory, LLP

(57) ABSTRACT

An aisle emergency brake system for a vehicle that is adapted to travel on at least one rail includes a brake assembly and a stop assembly that are adapted to stop the vehicle when engaged with each other. If the brake assembly is mounted to the vehicle, the stop assembly is mounted to the rail, or vice versa. The brake assembly includes a pair of brake pads and a biasing mechanism. The brake pads are nominally spaced apart an operating distance and face each other in a facing direction. The biasing mechanism biases the brake pads toward each other to the operating distance. The stop assembly includes a body defining two surfaces. The two surfaces face outwardly and have stopping portions that are spaced apart more than the operating distance of the brake pads.

16 Claims, 7 Drawing Sheets

(56) References Cited

U.S. PATENT DOCUMENTS

| | | | |
|---|---|---|---|
| 2,990,146 A * | 6/1961 | Terry | 244/110 A |
| 3,842,949 A * | 10/1974 | Newstead | 188/170 |
| 5,353,895 A * | 10/1994 | Camack et al. | 187/369 |
| 5,927,444 A * | 7/1999 | Checketts | 188/62 |
| 6,155,176 A * | 12/2000 | Checketts | 104/53 |
| 6,371,261 B1 * | 4/2002 | Thompson et al. | 188/250 G |
| 6,802,402 B2 * | 10/2004 | Bausch et al. | 188/171 |
| 7,140,302 B2 * | 11/2006 | Kickbush | 104/26.2 |
| 7,975,811 B2 * | 7/2011 | Berliant | 188/43 |
| 8,662,264 B2 * | 3/2014 | Legeret | 188/180 |
| 2011/0008137 A1 | 1/2011 | Yamashita | |
| 2011/0008138 A1 | 1/2011 | Yamashita | |

OTHER PUBLICATIONS

International Search Report and Written Opinion of the International Searching Authority from corresponding Patent Cooperation Treaty (PCT) Application No. PCT/US12/31199, mailed Dec. 3, 2012.

* cited by examiner

AISLE EMERGENCY BRAKE FOR RAIL-GUIDED VEHICLE

CROSS REFERENCE TO RELATED APPLICATIONS

This application claims the priority benefits of International Patent Application No. PCT/US2012/031199, filed on Mar. 29, 2012, which claims priority from U.S. patent application Ser. No. 61/471,326, filed on Apr. 4, 2011, the disclosure of which is hereby incorporated herein by reference in its entirety.

BACKGROUND OF THE INVENTION

The present invention is directed to an emergency brake for a vehicle and, in particular, to an emergency brake to prevent inadvertent passage of a rail-guided vehicle outside of its normal operating aisle. While the invention is particularly useful with a shuttle vehicle used in a three dimensional automated warehouse, it may find application with other rail-guided vehicles.

With automated vehicles operating in a three-dimensional automated warehouse, it is possible to have a vehicle inadvertently overrun its intended travel space. While such over-running may occur under a variety of conditions, it is more likely to occur when the automated warehouse is being programmed.

SUMMARY OF THE INVENTION

The present invention provides an aisle emergency brake system for a rail-guided vehicle that is reliable and relatively inexpensive. It is also capable of positively stopping the vehicle notwithstanding the greater increase in speed in which modern vehicles operate. Such increase in operating speed greatly increases the kinetic energy of the moving vehicle and, therefore, the difficulty of stopping the vehicle. The present invention utilizes the kinetic energy of the vehicle to stop the vehicle rather than energy stored in a tensioned device, or the like.

An aisle emergency brake system for a vehicle that is adapted to travel on at least one rail, according to an aspect of the invention, includes a brake assembly and a stop assembly that are adapted to stop the vehicle when engaged with each other. If the brake assembly is mounted to the vehicle, the stop assembly is mounted to the rail, or vice versa. The brake assembly includes a pair of brake pads and a biasing mechanism. The brake pads are nominally spaced apart an operating distance and face each other in a facing direction. The biasing mechanism biases the brake pads toward each other to the operating distance. The stop assembly includes a body defining two surfaces. The two surfaces face outwardly and have stopping portions that are spaced apart more than the operating distance of the brake pads.

The two surfaces may have centering portions that are angled toward each other. The centering portions initially engage the brake pads and center the brake pads in the facing direction. The brake pads may be spaced apart a biased distance when the biasing mechanism is compressed by the stopping portions, and the two surfaces may further have end-stop portions that are at least partially spaced apart more than the biased distance in order to prevent the brake assembly from passing the stop assembly. One of the brake pads may be fixedly mounted with the biasing mechanism biasing the other of the brake pads toward the fixed brake pad. The biasing mechanism may be made up of a plurality of Belleville washers. A bracket may be provided to mount the brake pads and the biasing mechanism. A self-centering mount may be provided that retains the bracket at the vehicle or the rail in a manner that allows movement of the bracket in the facing direction. The self-centering mount may be made up of a shaft and at least one opening surrounding the shaft. The opening(s) are elongated in the facing direction. The self-centering mount may allow the bracket to pivot about the opening(s) and the shaft in order to allow the brake assembly to be moved out of an operating position, where the brake assembly would engage the stop assembly, to a non-operating position. At least one torsion biasing member may be provided to bias the brake assembly to the operating position. The at least one torsion biasing member may be made up of a plurality of torsion springs to provide redundancy.

The brake pads and the stop assembly may both be made from aluminum or one may be made from aluminum and the other from steel to define a high-friction engagement. A disengagement tool may be provided to disengage the brake assembly from the stop assembly. The disengagement tool compresses the biasing mechanism until the brake pads are separated beyond the biased distance.

The stop assembly body may include two body portions that are fastened to opposite sides of a planar member having a particular thickness. The operating distance of the brake pads is greater than the particular thickness of the planar member.

These and other objects, advantages and features of this invention will become apparent upon review of the following specification in conjunction with the drawings.

DESCRIPTION OF THE PREFERRED EMBODIMENT

Figure 1:
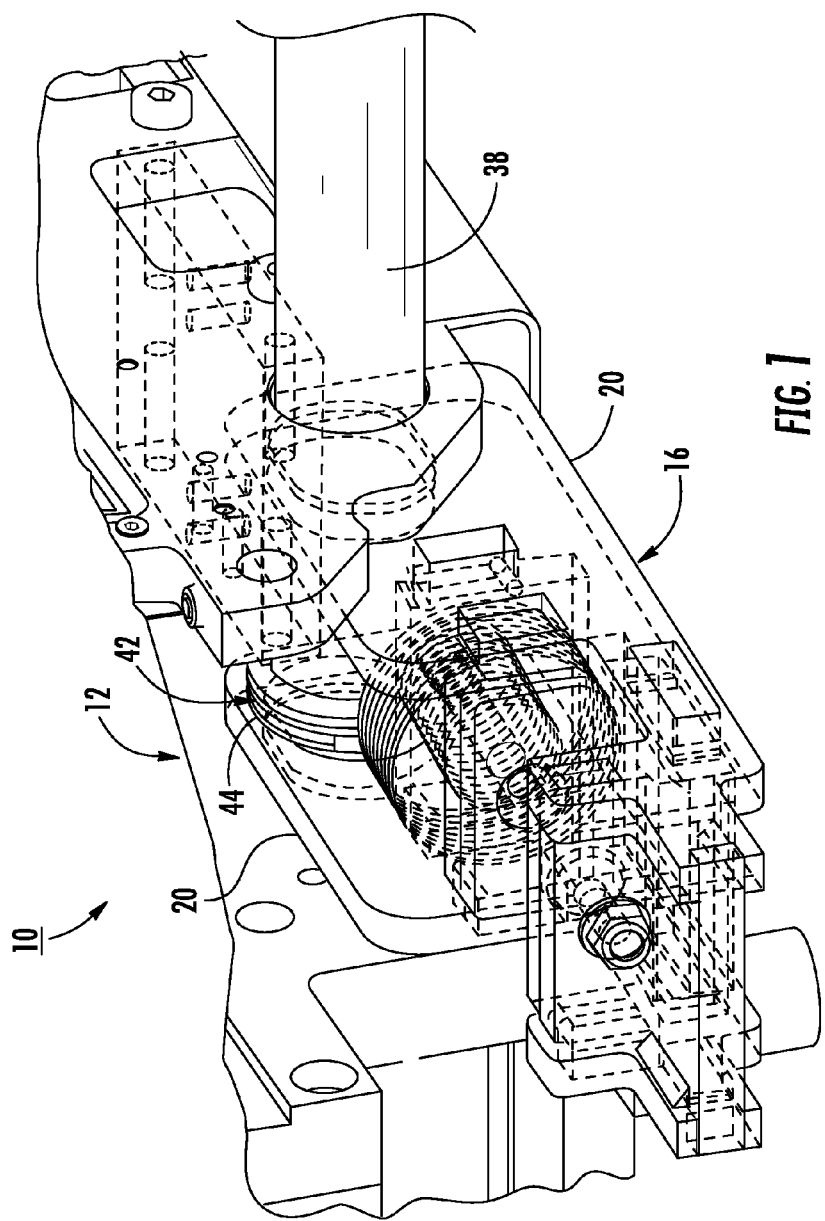
FIG. 1 is a perspective view of a brake assembly mounted to a rail-guided vehicle, according to an embodiment of the invention.

Referring now to the drawings and the illustrative embodiments depicted therein, an aisle emergency brake system 10 is provided for a vehicle 12 that is adapted to travel on one or more rails 14. Brake system 10 includes a brake assembly 16 and a stop assembly 18 that are adapted to stop vehicle 12 when engaged with each other. Brake system 10 is an emergency brake system that is intended to prevent damage should vehicle 12 inadvertently propel past the end of its intended travel space, such as an aisle in a three-dimensional automated warehouse, such as of the type disclosed in commonly assigned U.S. Patent Application Publication Nos. 2011/

0008137 A1 and 2011/0008138 A1, the disclosures of which are hereby incorporated herein by reference in their entirety. Brake system 10 may be useful during normal operation startup or maintenance of the automated warehouse.

Brake assembly 16 is illustrated as mounted at vehicle 12 and stop assembly mounted at rail 14. However, it should be understood that the brake assembly could be mounted to the rail and the stop assembly to the vehicle.

Figure 2:
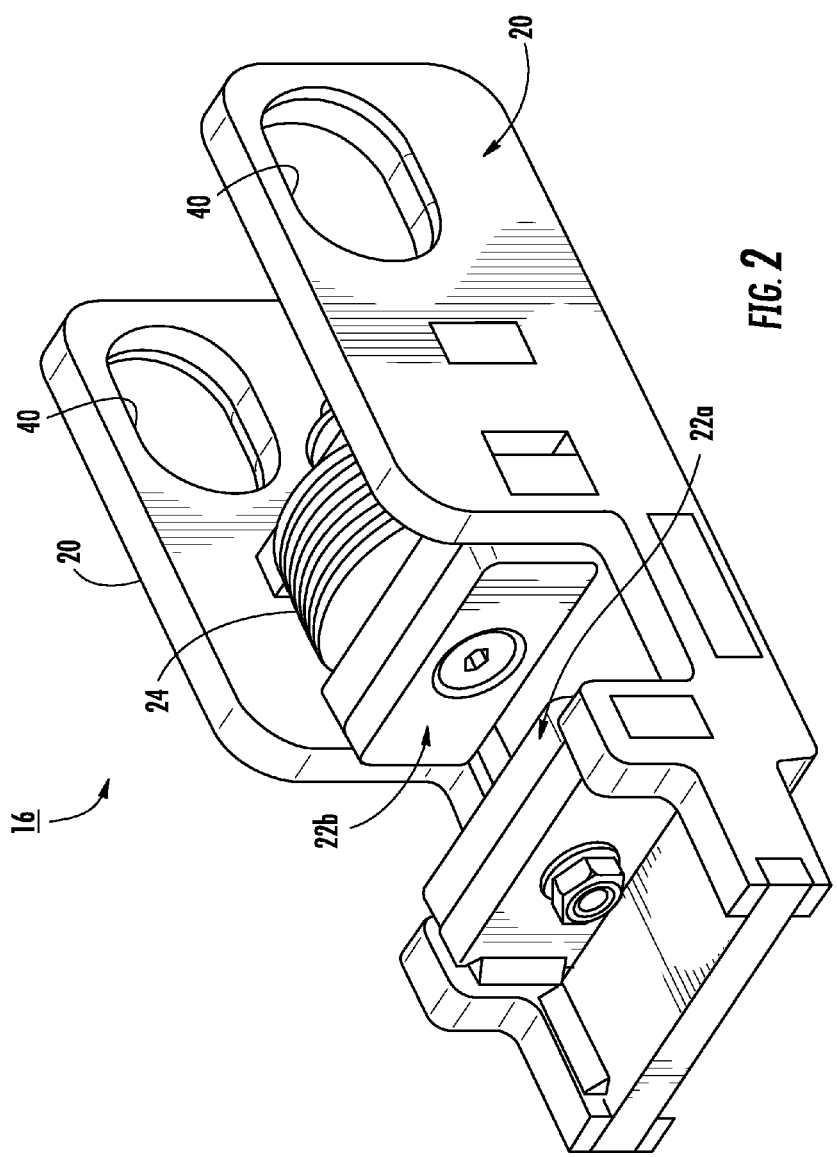
FIG. 2 is the same view as FIG. 1 showing additional details of the brake assembly.
Figure 4:
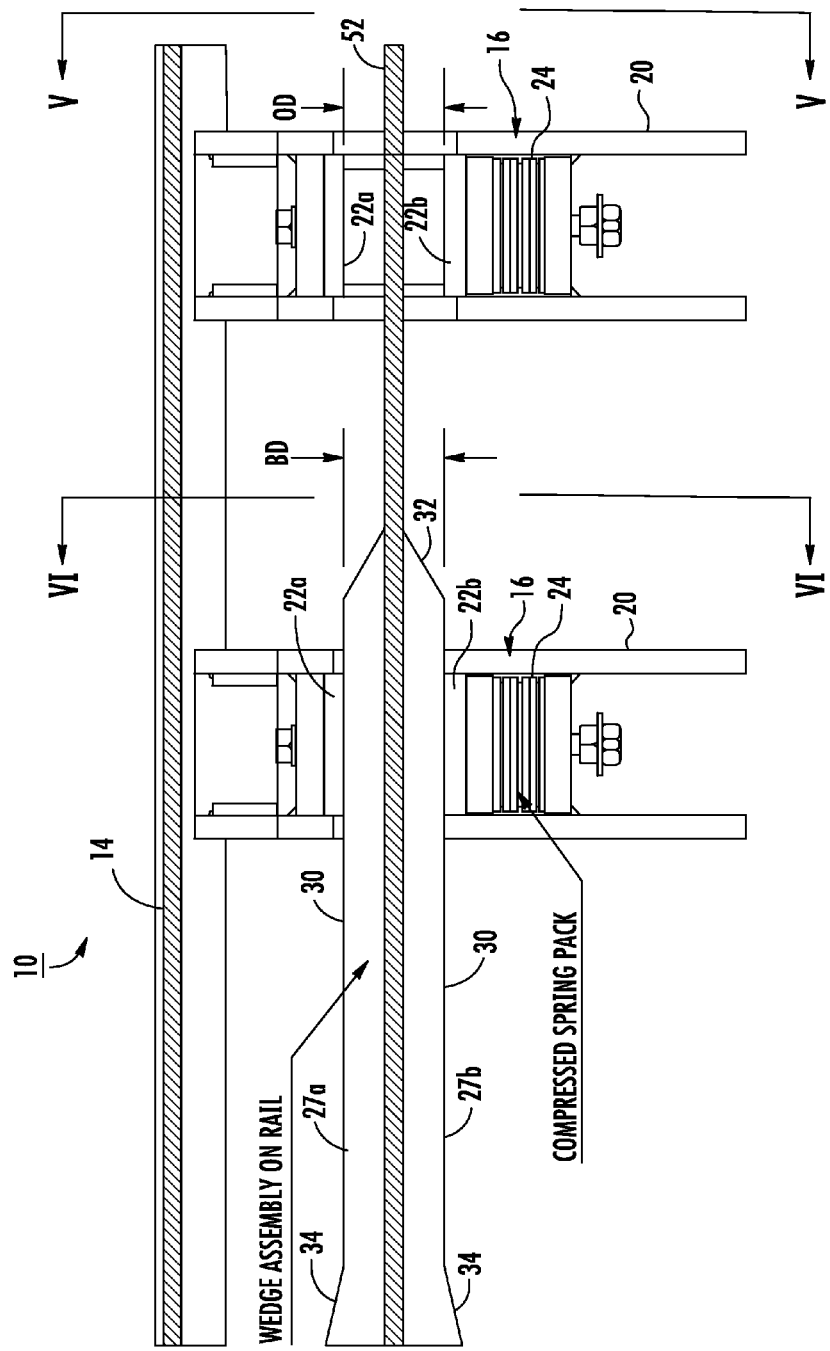
FIG. 4 is a top plan view of an aisle emergency brake system showing the brake assembly in two positions with respect to the stop assembly.
Figure 5:
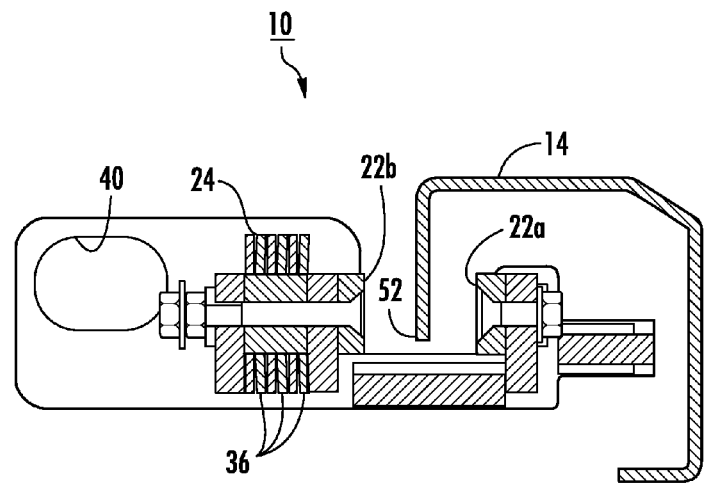
FIG. 5 is a sectional view taken along the lines V-V in FIG. 4.
Figure 6:
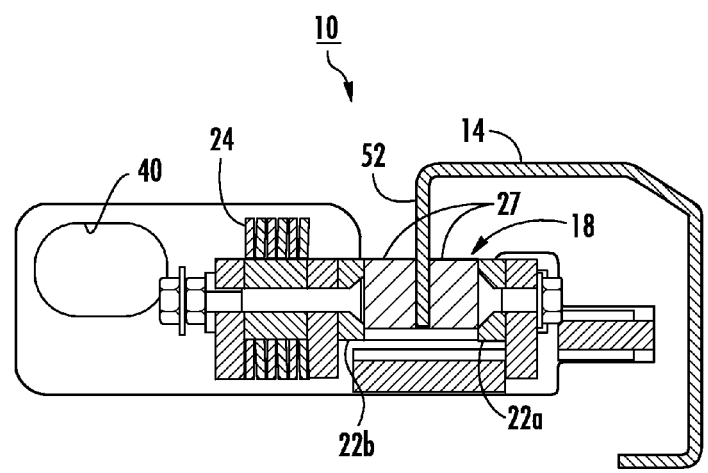
FIG. 6 is a sectional view taken along the lines VI-VI in FIG. 4.

Brake assembly 16 is made up of a bracket 20, a pair of brake pads 22a, 22b and a biasing mechanism 24 that are mounted to a bracket 20 (FIG. 2). Brake pads 22a, 22b are nominally spaced apart an operating distance OD and face each other in a facing direction (FIG. 4). Biasing mechanism 24 biases brake pads 20a, 20b toward each other to operating distance OD. Brake pads 20a, 20b are separated to a biased distance BD when biasing mechanism 24 is compressed under emergency operation of the brake system, as illustrated in FIGS. 4 and 6 and as will be discussed below. A self-centering mount 26 retains bracket 20 to vehicle 12 in a manner that allows limited movement of bracket 20 in the facing direction of the brake pads.

Figure 3:
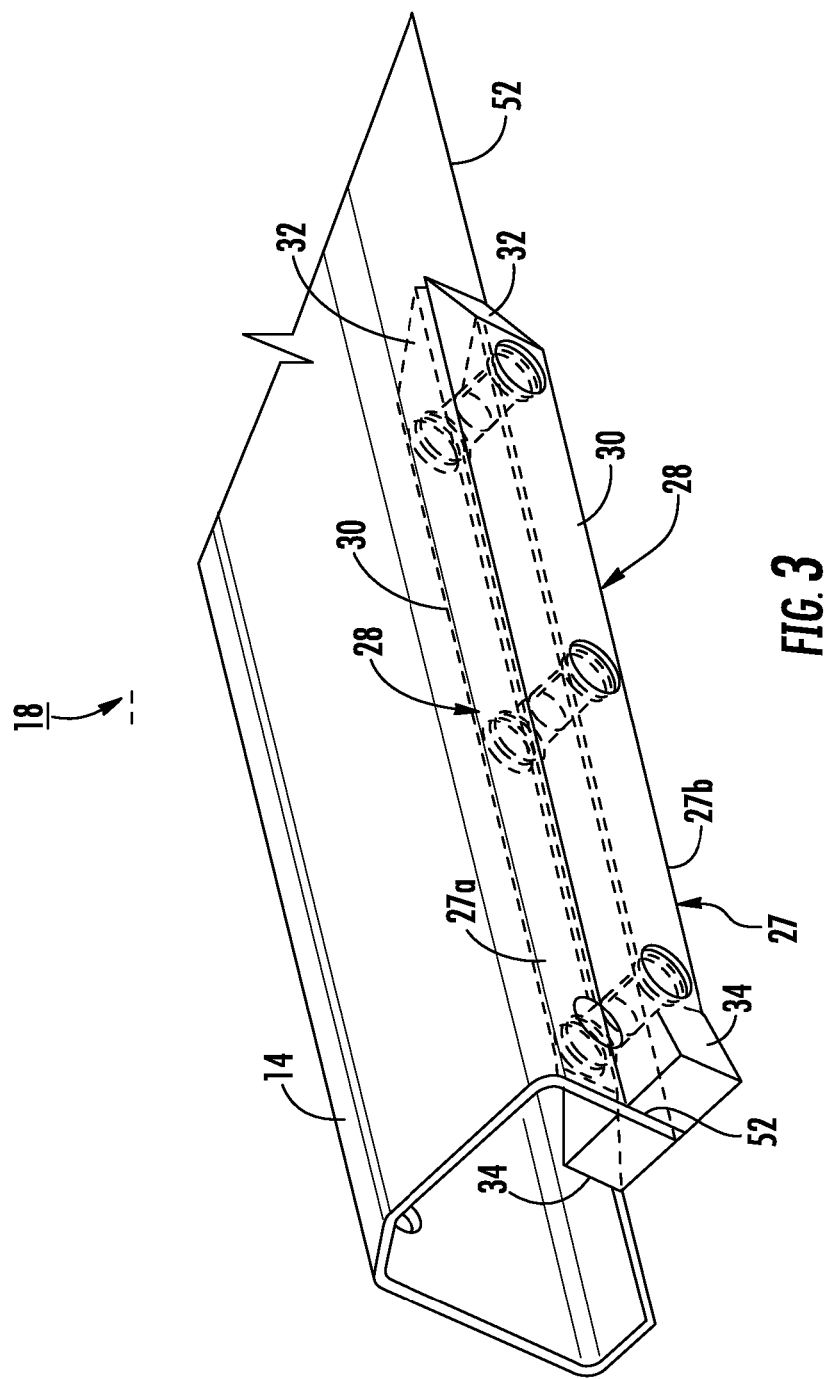
FIG. 3 is a perspective view of a stop assembly mounted to a rail upon which the vehicle travels.

Stop assembly 18 includes a body 27 that defines two surfaces 28 that face outwardly (FIG. 3). Surfaces 28 each have stopping portions 30 that are spaced apart more than operating distance OD and less than biased distance BD of brake pads 22a, 22b. Surfaces 38 further have centering portions 32 that are angled toward each other in the direction facing the approaching brake assembly 16. Centering portions 32 are for the purpose of initially engaging brake pads 22a, 22b and center the brake pads in said facing direction as bracket 20 is allowed to move in that direction by self-centering mount 26. This ensures that generally equal stopping pressure is applied between each brake pad 22a, 22b and its associated stopping portion 30 of surface 28. Surfaces 28 further have end-stop portions 34 that taper outwardly from stopping portions 30 to where they are spaced apart more than biased distance BD of the brake pads in order to prevent brake assembly 16 from passing stop assembly 18 should brake system 10 fail to operate in its expected manner. Body 27 is divided into two portions 27a, 27b that are fastened, such as with rivets, or the like, to opposite sides of a planar member 52 that makes up a portion of rail 14. The operating distance OD of brake pads 22a, 22b is greater than the thickness of planar member 52 so that the brake pads do not make contact with planar member 52. If vehicle 12 has horizontal guide rollers (not shown) on one side thereof that engage one rail 14, then stop assembly 18 would be mounted to the other rail 14 that is not engaged by horizontal guide rollers in order to avoid engagement between the horizontal guide rollers and stop assembly 18.

Brake pad 22a is fixedly mounted to bracket 20 and biasing mechanism 24 biases brake pad 22b toward brake pad 22a. This is possible because the combination of self-centering mount 26 and the configuration of surfaces 28 repositions brake pads 22a, 22b to apply generally the same stopping force. In the illustrated embodiment, biasing mechanism 24 is made up of a plurality of Belleville washers 36. Belleville washers are capable of providing a very high amount of biasing force over a relatively short distance as is known in the art. Such washers are commercially available from various sources. Self-centering mount 26 is made up of a mounting shaft 38 and two openings 40 in bracket 20 that surround shaft 38. Openings 40 are elongated in the facing direction of the brake pads in order to allow limited movement of bracket 20 in the facing direction for self-centering of the brake pads.

Figure 7:
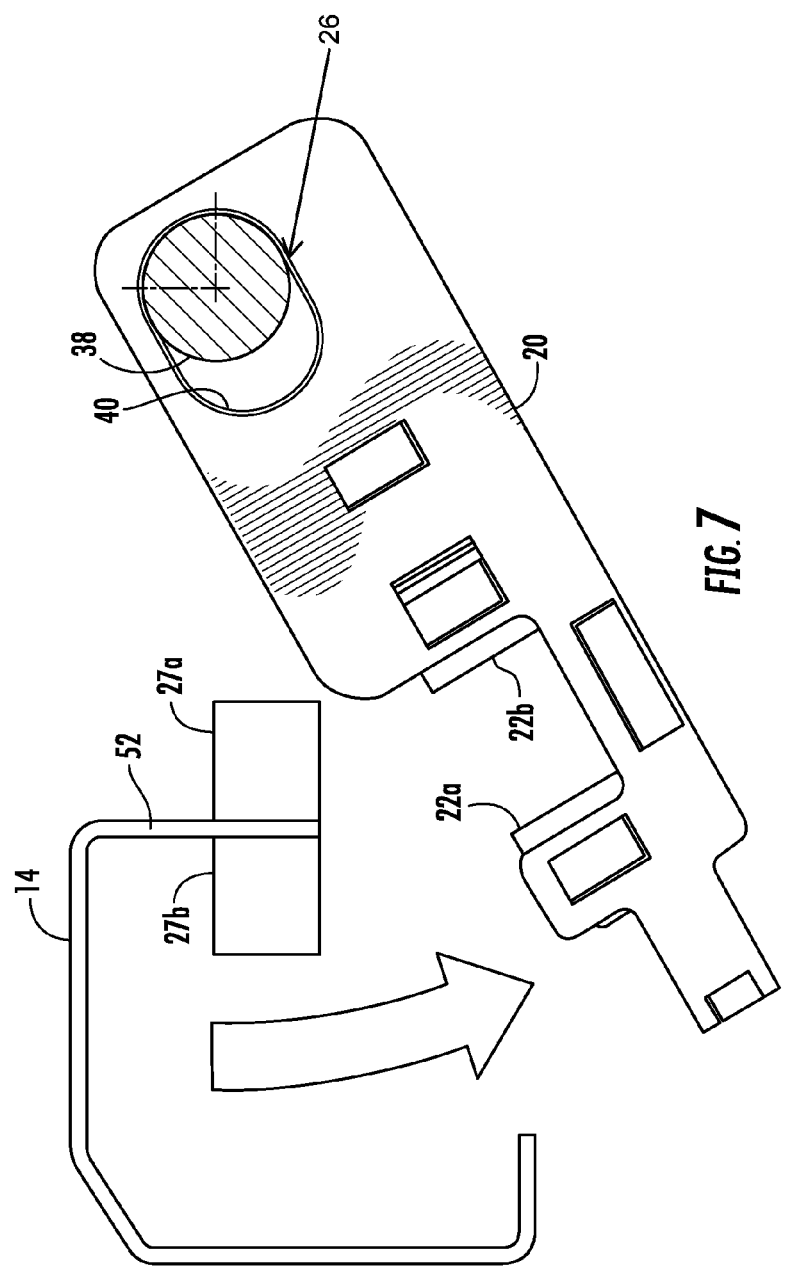
FIG. 7 is an end elevation view illustrating movement of the brake assembly from an operating position to a non-operating position.

Self-centering mount 26 also allows bracket 20 to pivot about openings 40 and shaft 38 in order to allow brake assembly 16 to be moved out of an operating position where the brake assembly would engage said stop assembly to a non-operating position, as illustrated in FIG. 7. At least one torsion biasing member 42 is provided to bias brake assembly 16 to the operating position. In the illustrated embodiment. The at least one torsion biasing member is a plurality of torsion springs 44, each operation on one portion of bracket 20. This provides redundancy so that brake assembly 16 would remain in its operating position even if one of torsion springs 44 were to fail. While the illustrated embodiment contemplates that brake assembly 16 would be manually pivoted out of the way, such as by a technician to remove vehicle 12 from service or to place it back into service, an optional motor (not shown) may be provided to allow the brake assembly to be routinely pivoted out of the way by the motor operating under the commands of a control (not shown) in order to allow the vehicle to leave its normal operating space. This may be used, for example, in the case of a vehicle that leaves its aisle to be deployed to a lift, or the like, such as disclosed in commonly assigned U.S. Patent Application Publication No. 2011/0008137 referred to above.

Because brake system 10 is intended to be an emergency brake, brake pads 22a, 22b do not need to be made from a conventional brake pad material, such as of the type used in vehicular brakes. The primary criterion is a high-friction interface between brake pads 22a, 22b and surfaces 28. This may be accomplished, for example, by both the brake pads and body 27 of stop assembly 18 made of aluminum to produce a coefficient of friction of approximately 1.0 or by brake pads being made from aluminum and body 27 being made from steel or other iron-based metal, or vice versa, to define a high-friction engagement. Other examples will be apparent to the skilled artisan.

Figure 8:
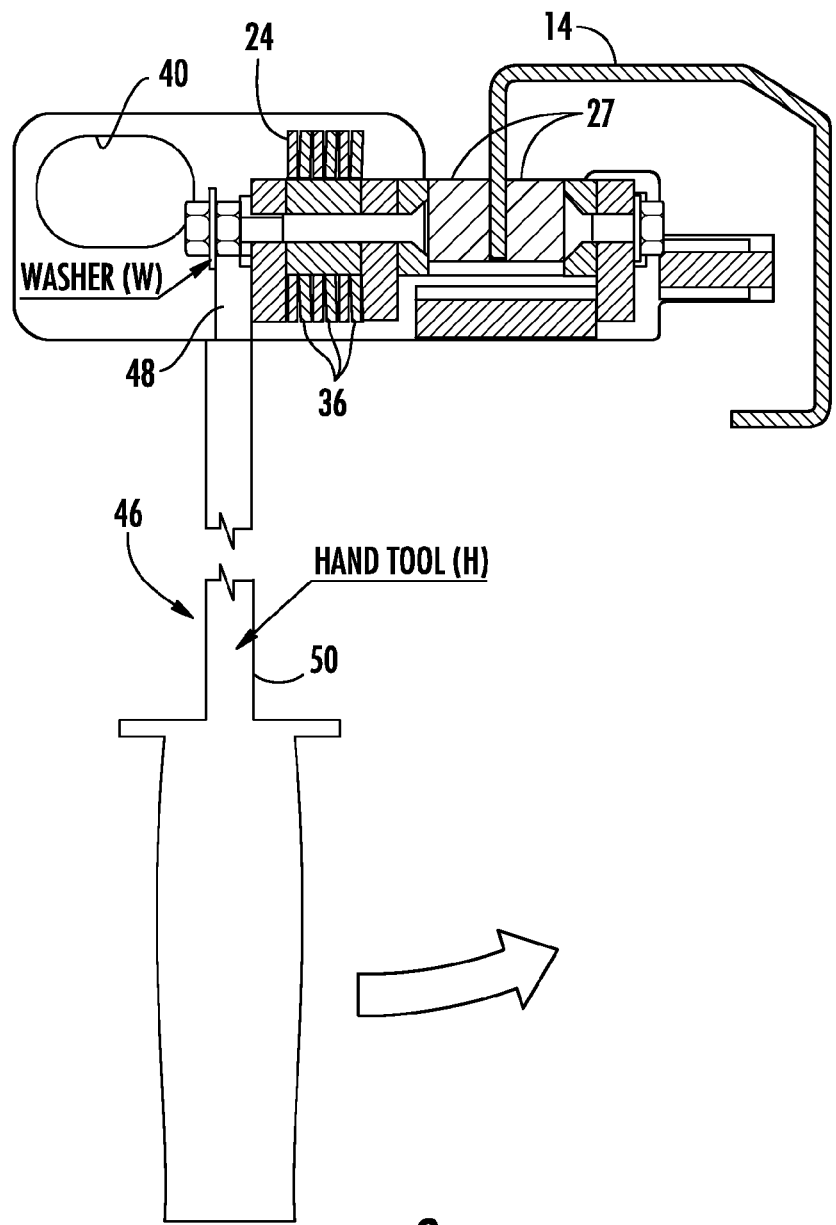
FIG. 8 is an end elevation showing operation of a disengagement tool.

A disengagement tool 46 may be provided to disengage said brake assembly 16 from stop assembly 18. Disengagement tool 46 includes a lever portion 48 that compresses biasing mechanism 24 until brake pads 22a, 22b are separated beyond biased distance BD so that the vehicle can be slid off of the stop assembly. Disengagement tool 46 also includes a handle portion 50 that can be grasped by a technician and pivoted in the manner illustrated in FIG. 8 to apply leverage to lever portion 48. An increase in leverage may be provided by making handle portion 50 significantly longer than lever portion 48.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An aisle emergency brake system for a vehicle that is adapted to travel on at least one rail, said brake system comprising:

a brake assembly and a stop assembly that are adapted to stop the vehicle when engaged with each other, said brake assembly adapted to be mounted at one chosen from the vehicle and the at least one rail, said stop assembly adapted to be mounted at the other chosen from the vehicle and the at least one rail;

said brake assembly comprising a pair of brake pads and a biasing mechanism, said brake pads nominally spaced apart an operating distance and facing each other in a facing direction, said biasing mechanism adapted to bias said brake pads toward each other to the operating distance; and said stop assembly comprising a body defining two surfaces, said two surfaces facing outwardly and having stopping portions that are spaced apart more than the operating distance of said brake pads wherein said brake pads are spaced apart a biased distance when said biasing mechanism is compressed by said stopping portions, said two surfaces have end-stop portions that are at least partially spaced apart more than the stopping portions are spaced apart and more than the biased distance in order to prevent the brake pads from passing the end-stop portions.

2. The brake system as claimed in claim 1 wherein said two surfaces have centering portions that are angled toward each other, said centering portions being adapted to initially engage said brake pads and to center said brake pads in said facing direction.

3. The brake system as claimed in claim 1 wherein one of said brake pads is fixedly mounted and said biasing mechanism biases the other of said brake pads toward said one of said brake pads.

4. The brake system as claimed in claim 1 wherein said biasing mechanism comprises a plurality of Belleville washers.

5. The brake system as claimed in claim 1 wherein one chosen from said brake pads and said stop assembly body are made from aluminum and the other of said brake pads and said stop assembly body are made from aluminum or steel to define a high-friction engagement.

6. The brake system as claimed in claim 1 wherein said stop assembly body comprises two body portions that are fastened to opposite sides of a planar member having a particular thickness and wherein said operating distance of said brake pads is greater than said particular thickness.

7. The brake system as claimed in claim 1 wherein said brake assembly is adapted to be mounted at the vehicle and said stop assembly is adapted to be mounted at the rail.

8. An aisle emergency brake system for a vehicle that is adapted to travel on at least one rail, said brake system comprising:
 a brake assembly and a stop assembly that are adapted to stop the vehicle when engaged with each other, said brake assembly adapted to be mounted at one chosen from the vehicle and the at least one rail, said stop assembly adapted to be mounted at the other chosen from the vehicle and the at least one rail;
 said brake assembly comprising a pair of brake pads and a biasing mechanism, said brake pads nominally spaced apart an operating distance and facing each other in a facing direction, said biasing mechanism adapted to bias said brake pads toward each other to the operating distance;
 said stop assembly comprising a body defining two surfaces, said two surfaces facing outwardly and having stopping portions that are spaced apart more than the operating distance of said brake pads; and
 a bracket supporting said brake pads and said biasing mechanism and a self-centering mount that is adapted to retain said bracket at said one chosen from the vehicle and the at least one rail in a manner that allows movement of said bracket in the facing direction.

9. The brake system as claimed in claim 8 wherein said self-centering mount comprises a shaft and at least one opening surrounding said shaft, said at least one opening elongated in the facing direction.

10. The brake system as claimed in claim 9 wherein said self-centering mount allows said bracket to pivot about said at least one opening and said shaft in order to allow said brake assembly to be moved out of an operating position, where the brake assembly would engage said stop assembly, to a non-operating position.

11. The brake system as claimed in claim 8 wherein said self-centering mount allows said bracket to pivot about said at least one opening and said shaft in order to allow said brake assembly to be moved out of an operating position, where the brake assembly would engage said stop assembly, to a non-operating position.

12. The brake system as claimed in claim 11 including at least one torsion biasing member that is adapted to bias said brake assembly to the operating position.

13. The brake system as claimed in claim 12 wherein said at least one torsion biasing member comprises a plurality of torsion springs to provide redundancy.

14. An aisle emergency brake system for a vehicle that is adapted to travel on at least one rail, said brake system comprising:
 a brake assembly and a stop assembly that are adapted to stop the vehicle when engaged with each other, said brake assembly adapted to be mounted at one chosen from the vehicle and the at least one rail, said stop assembly adapted to be mounted at the other chosen from the vehicle and the at least one rail;
 said brake assembly comprising a pair of brake pads and a biasing mechanism, said brake pads nominally spaced apart an operating distance and facing each other in a facing direction, said biasing mechanism adapted to bias said brake pads toward each other to the operating distance;
 said stop assembly comprising a body defining two surfaces, said two surfaces facing outwardly and having stopping portions that are spaced apart more than the operating distance of said brake pads; and
 a disengagement tool that is adapted to disengage said brake assembly from said stop assembly.

15. The brake system as claimed in claim 14 wherein said disengagement tool compresses said biasing mechanism until said brake pads are separated beyond said biased distance.

16. A rail-guided vehicle system, comprising:
 at least one rail;
 a vehicle that is adapted to travel on said at least one rail;
 an aisle emergency brake system for said vehicle, said brake system comprising a brake assembly and a stop assembly that are adapted to stop the vehicle when engaged with each other, said brake assembly mounted at one chosen from the vehicle and the at least one rail, said stop assembly mounted at the other chosen from the vehicle and the at least one rail;
 said brake assembly comprising a pair of brake pads and a biasing mechanism, said brake pads nominally spaced apart an operating distance and facing each other in a facing direction, said biasing mechanism adapted to bias said brake pads toward each other to the operating distance;
 said stop assembly comprising a body defining two surfaces, said two surfaces facing outwardly and having stopping portions that are spaced apart more than the operating distance of said brake pads; and
 a bracket supporting said brake pads and said biasing mechanism and a self-centering mount that is adapted to retain said bracket at said one chosen from the vehicle and the at least one rail in a manner that allows movement of said bracket in the facing direction.

* * * * *